MAGNETIC ENCODING MECHANISM

Filed April 30, 1962 5 Sheets-Sheet 1

INVENTOR
JAMES KILBURG
BY
Fryer & Tjensvold
ATTORNEYS

INVENTOR.
JAMES KILBURG
BY
Frye + Tjensvold
ATTORNEYS

Jan. 11, 1966 | J. KILBURG | 3,229,043

MAGNETIC ENCODING MECHANISM

Filed April 30, 1962 | 5 Sheets-Sheet 3

INVENTOR.
JAMES KILBURG

BY Frye + Tjensvold

ATTORNEYS

INVENTOR.
JAMES KILBURG
BY
Fryer & Tjensvold
ATTORNEYS

INVENTOR.
JAMES KILBURG
BY
Fryer & Tjensvold
ATTORNEYS

United States Patent Office 3,229,043

Patented Jan. 11, 1966

3,229,043

MAGNETIC ENCODING MECHANISM

James Kilburg, San Carlos, Calif., assignor to Dasa Corporation, a corporation of California Filed Apr. 30, 1962, Ser. No. 191,051
5 Claims. (Cl. 179—90)

The present invention pertains to encoding or producing a coded representation of a multi-digit number or the like on a magnetizable medium from which it may be decoded or read back in the form of a plurality of spaced impulses in an electric circuit such for example as a telephone circuit as in dialing to create a connection with another subscriber's telephone.

Automatic telephone dialing machines are known where a magnetizable medium carries subscriber's numbers in code formed by spaced magnetized areas or bits. Such media are in the form of drums or tapes adjustable to present numbers selectively to a transducer or head which scans the selected number and translates it through an amplifying and multivibrator circuit into impulses in the telephone circuit. One such automatic telephone dialing machine embodying a tape as the magnetizable medium is disclosed in the co-pending application for United States Letters Patent of James Kilburg entitled "Automatic Telephone Dialer of the Magnetic Storage Type," filed April 30, 1962, Serial No. 101,050.

The device of the present invention has been designed for use with the machine of said co-pending application and will be described by reference thereto but its application to other telephone dialers and other machines wherein a magnetic code is created is anticipated and will be readily understood from the ensuing description.

It is an object of the present invention to provide an encoding mechanism of the kind described wherein the numbers to be encoded are selected by a set of numbered push buttons or depressible keys.

A further object of the invention is to provide indicating means operable in response to the selection of a number on a keyboard to display the selected number so that it may be checked for accuracy before it is decoded into a telephone circuit.

Another object of the invention is to provide means in the form of a magnetizable medium in addition to that used in the telephone dialer, the purpose of which is to receive the coded information and which will be referred to hereinafter as a buffer memory.

Another object is to provide means for decoding a number from the buffer memory directly into a telephone circuit repeatedly until it has been erased as by encoding another number thereon, or alternately for decoding it onto the tape or permanent memory of the dialer whereupon it will be encoded thereon for future use.

It is also an object of the invention to provide means for encoding numbers in such a manner and with such uniform spacing between bits that they may be decoded at the maximum speed permissible in a telephone circuit selecting system and to provide uniform minimum interdigital time in a multi-digit number.

A further object is to provide means for creating an interdigital pause period exceeding the usual interdigital time to effect interruption of a decoding operation when it is necessary to await a dial tone as required in nine level and some direct distance dialing as described in the aforementioned co-pending application.

A still further object of the invention is to derive power from the above mentioned mechanisms and functions from a power source rather than through motion of the manually depressed keys.

The means for accomplishing the foregoing objects is described in the following specification by reference to the accompanying drawings and still further objects and advantages will become apparent therefrom.

Figure 1:
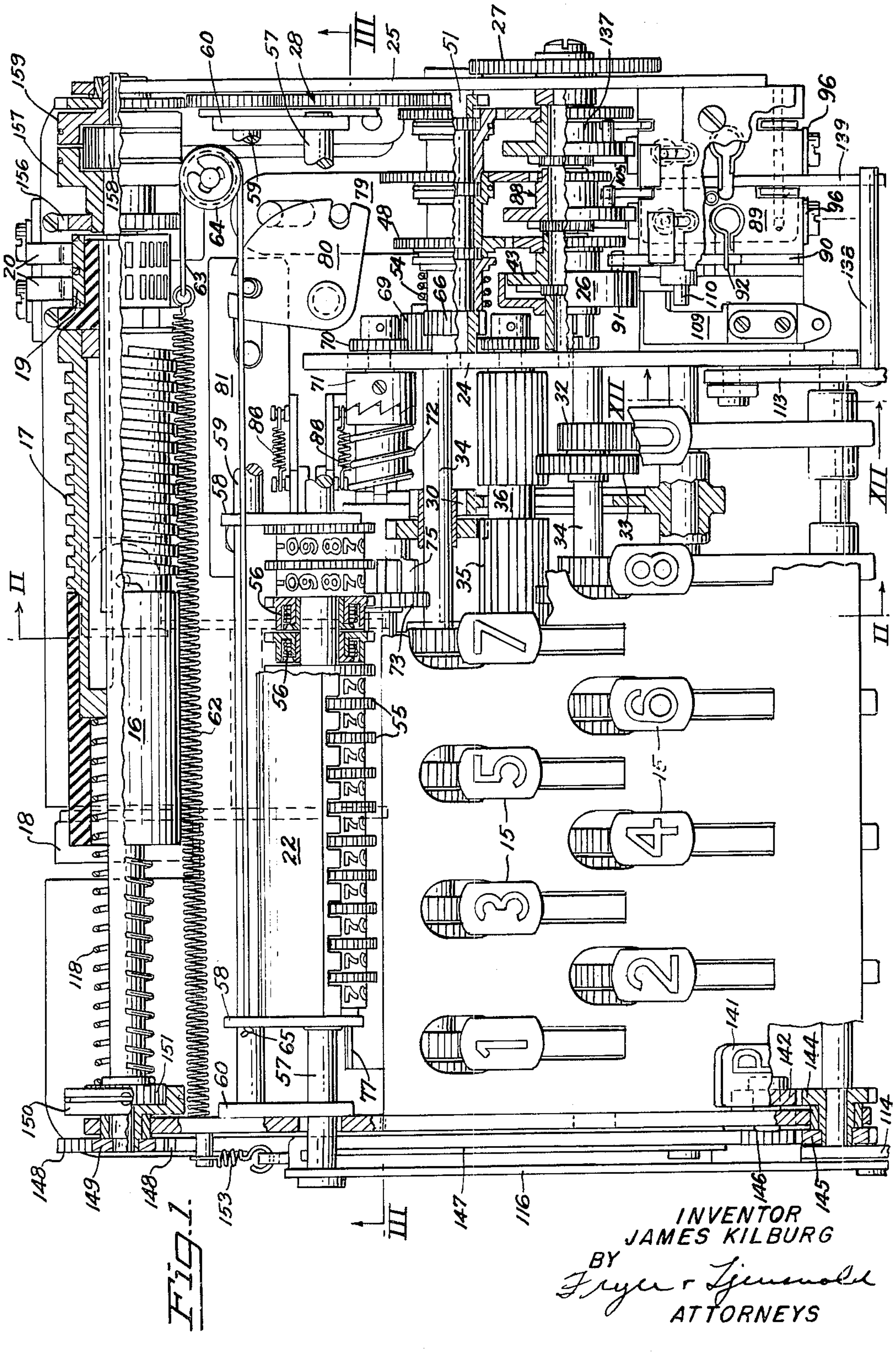
FIG. 1 is a plan view of the principal parts of the mechanism of the present invention with the housing removed and with parts shown in section and parts broken away.

Referring first to FIG. 1 of the drawings, the machine of the present invention is seen to have a keyboard comprising ten keys 15 numbered from one to zero. A drum 16 treated to produce a magnetizable surface is rotatable and advanceable together with a feed screw 17 so that a stationary transducer shown at 18 in FIG. 1 and in contact with the surface of the drum will trace a spiral path thereon during its movement. A commutator 19 is fixed for rotation with the drum and feed screw and through brushes 20 provides interrupted current through the transducer to create spaced magnetized areas on the drum following the spiral path. These areas are produced about 20° apart in the present design. The magnetized areas are grouped to represent numbers, the number of such areas in each group corresponding to the value of the digit represented. Suitable spaces between digits are also provided for.

In the present machine, depression of any one of the keys 15 effects rotation and advancing of the drum for a distance which will cause the creation thereof of spaced magnetized areas equal in number to the value of the digit on the key depressed.

An indicator shown at 22 is composed of a plurality of drum shaped numbered dials and depression of a key also effects rotation of a dial to display thereon the number of the key depressed. This has the advantage that any number which has been entered upon the buffer memory drum can be read back from the indicator and checked against the telephone directory or other source to be certain that it is correct before it is played into the telephone circuit or recorded upon the permanent memory of an automatic telephone dialer. The gear trains and clutch mechanism through which rotary motion is transmitted to the buffer memory 16 are contained principally between a pair of frame plates shown at 24 and 25 in FIG. 1 and since the gear trains are of conventional design well within the ability of a skilled mechanic to produce, their detailed description is unnecessary to an understanding of the present invention, though the clutches and other mechanisms for producing selective operation will be described.

Figures 2, 3:
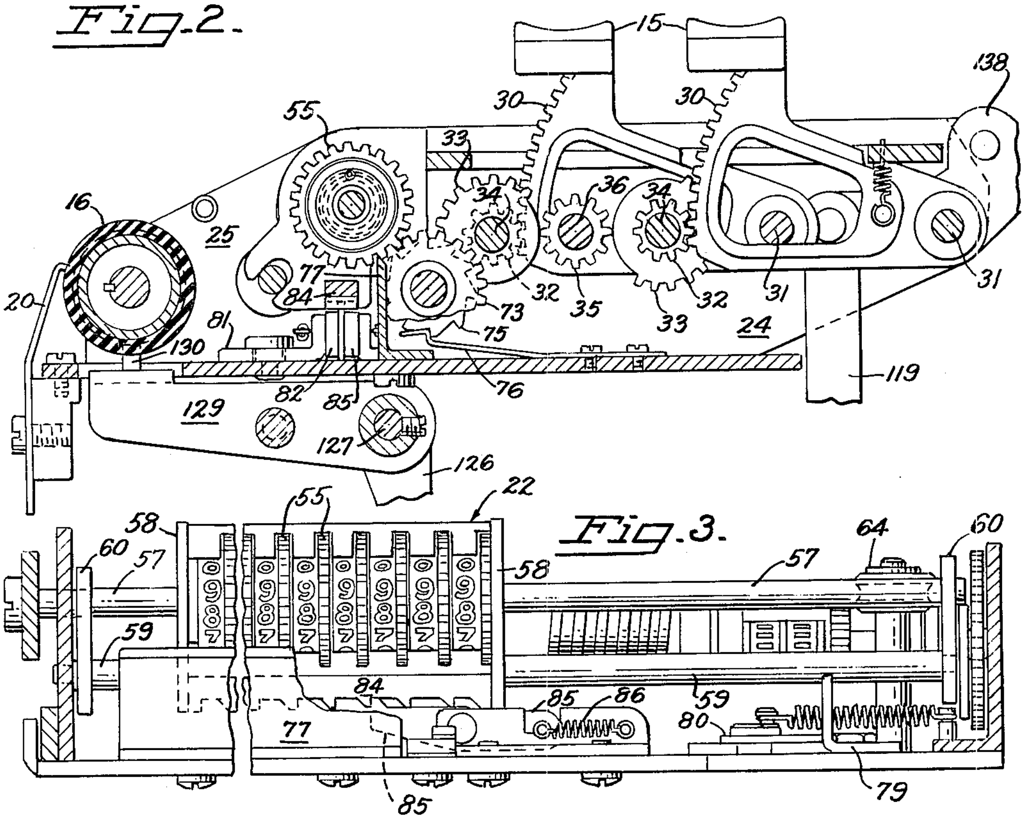
FIG. 2 is a sectional view taken on the line II—II of FIG. 1.
FIG. 3 is a view in front elevation of the indicating mechanism principally as viewed from the line III—III of FIG. 1.
Figure 6:
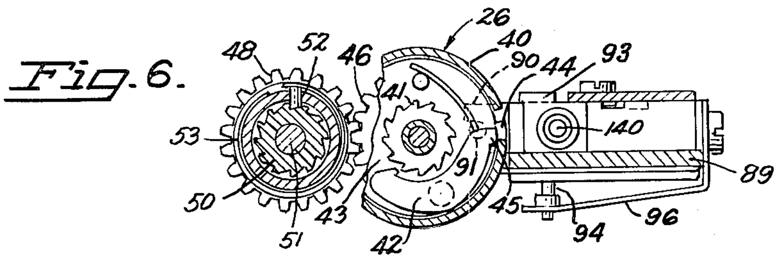
FIG. 6 is a fragmentary view showing details of construction of a clutch and a portion of its control mechanism.

A first clutch shown at 26 in FIG. 1, which will be referred to as the digital clutch, serves to transmit rotary motion to the buffer memory through an arc dependent in extent upon the key depressed. This is accomplished by connecting a driven gear 27 through a suitable gear train, a portion of which is shown at 28, to the buffer memory. The gear 27 may be driven by any suitable source of power (not shown) as for example the same motor which drives the decoding mechanisms of an automatic telephone dialer of the kind disclosed in the above mentioned application. The clutch 26 is shown in FIG. 6 and it is conditioned for a partial cycle corresponding in magnitude to the key depressed by means best shown in FIG. 2. As illustrated in FIG. 2 each of the keys 15 is carried by a gear segment 30 pivotally supported as at 31 for downward swinging movement on depression of a key. The segment 30 meshes with a pinion 32 to drive it and an associated segment gear 33 fixed to it and freely rotatable on a shaft 34. There are, as shown, two such shafts 34 and two sets of segment gears to accommodate the two rows of keys on the keyboard. Each of the segments 33 has ten teeth which extend throughout substantially one-half of its periphery and the segments are so indexed with respect to a driven gear 35 that upon one full operation of the segment gear, the driven gear will be engaged and rotated a distance corresponding to the number on the key depressed. The driven gear 35 is fixed to and drives a shaft 36. The shaft 36 extends through the frame plate 24 (see FIG. 8) and carries a gear 38 which meshes with a gear 39 carried by and adapted to impart rotary motion or angular displacement to a clutch control drum 40 (see also FIG. 6). The clutch comprises a ratchet wheel 41 fixed to a shaft which is driven when the machine is under power and a pawl 42 pivotally supported on a support disc 43. This disc has a projection 44 extending into a slot in the drum 40 to permit only limited relative rotation between the drum and the disc. The pawl 42 also has a tail 45 capable of projecting into the same slot when the drum 40 is rotated counterclockwise, as viewed in FIG. 6, with respect to the pawl plate and this enables the pawl to engage the ratchet wheel 41 to be driven thereby and to rotate the pawl disc and a gear 46 secured thereto. The length of time or duration of clutch engagement will depend upon the distance that the drum 40 has been displaced by depression of a key because when the drum is arrested, the tail of the pawl will engage the edge of the notch in the drum to disengage the pawl from the ratchet wheel 41 and discontinue rotary motion. The gear 46 meshes with a gear 48 which, together with its hub, forms the outer part of an overriding clutch. This clutch comprises a ratchet wheel 50 secured to a shaft 51. A pin 52 slidable through the hub of gear 48 is urged into engagement with the ratchet wheel 50 by means of a spring 53 encircling the hub. The shaft 51, as is shown in FIG. 1, has a driving connection with the gear train 28 for imparting angular or rotary motion to the buffer memory. It is through the medium of the ratchet mechanism in the gear 48 that the gear 48 and the digital clutch 26 may be returned to their home position without similar return movement being imparted to the shaft 51. This return movement of the digital clutch is accomplished by means of a torsion spring which surrounds the shaft 51 and is shown at 54 in FIG. 1.

Since the same drive means set in motion by the digital clutch moving the buffer memory is employed for actuating the dial wheels of the indicator, the operation of the indicator will be described at this time before further description of the manner in which interdigital spacing and pause periods are accomplished in encoding a number on the buffer memory.

Figure 8:
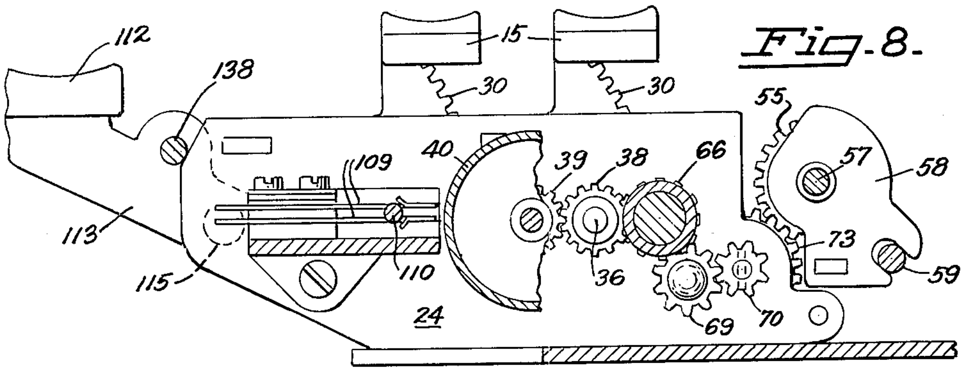
FIG. 8 is a sectional view illustrating a portion of the drive mechanism to the buffer memory and also illustrating the drive to the indicator.

The indicator assembly is best illustrated in FIGS. 2, 3 and 8. Each of the dial wheels of the indicator assembly is secured to a gear, as shown at 55 in FIGS. 1 and 8, and torsion springs shown at 56 in FIG. 1 disposed within the drum shaped dials urge them toward their zero positions. The entire assembly is mounted for sliding movement on a rod 57 (FIG. 3) and end plates 58 on the indicator assembly are notched to embrace a parallel rod 59. The rods 57 and 59 are held in spaced parallelism by a pair of plates 60 adjacent their ends. The rod 59 is anchored in frame plates of the machine at both ends but the rod 57 is free to swing upwardly about the axis of rod 59 for disengaging driving gears on the indicator as will presently be described in greater detail.

The normal position of the indicator assembly before it has been actuated is to the right of that shown in FIGS. 1 and 3 and it is urged to its normal position by a spring 62 (see FIG. 1) with a cable 63 passing over a sheave 64 and anchored to the indicator assembly as at 65.

When the first digit of a number is encoded on the buffer memory, that number is set up on the leftmost dial of the indicator assembly and the assembly is advanced one step toward the left to enable the second member to be set up on the second dial. Setting up of the first number on the indicator assembly is accomplished with motion derived from the gear 48 previously described as providing motion for driving the buffer memory. This gear is coupled by a common hub with a gear 66 (see also FIG. 8) which drives gears 69 and 70. The gear 70 is fixed to a shaft to which is also fixed one element of a ratchet face clutch 71 in FIG. 1. The opposite member of the ratchet clutch 71 is slidable with respect to the shaft but urged into clutching engagement by means of a compression spring 72. The driven element of the clutch is in driving engagement with a gear 73 (FIGS. 1 and 8) rotatable on a common axis with the clutch and adapted to mesh with any of the gears 55 which drive the indicator dials. Consequently if the indicator assembly is advanced step by step from right to left as viewed in FIG. 1, the gear 73 meshes sequentially with all of the gears 55 and rotation imparted to the gear 73 through the ratchet clutch 71 is proportionate to rotation imparted to the buffer memory so that the number on the dial which is rotated corresponds to the number encoded upon the buffer memory.

Figure 14:
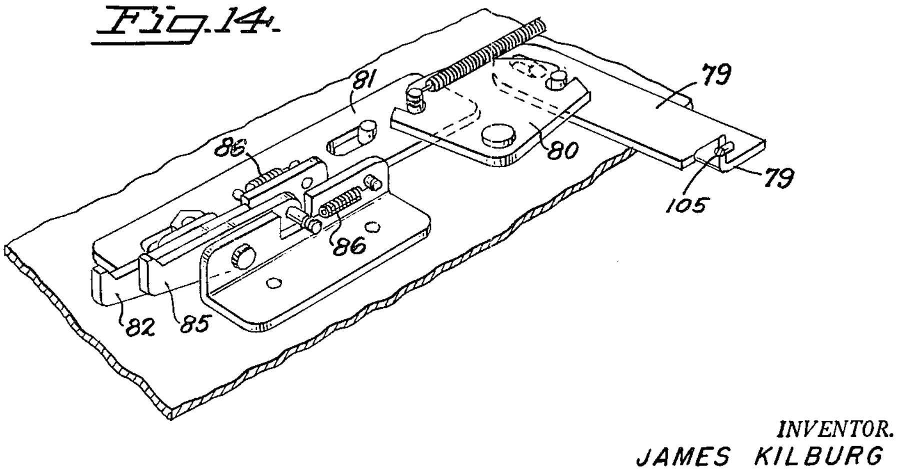
FIG. 14 is a perspective view of a portion of the mechanism employed for advancing a set of indicator dials.

Detent means are provided for holding the dials in their set positions in the form of the ratchet wheel shown at 75 in FIGS. 1 and 2 which cooperates with a leaf spring 76 and which is fixed for rotation with the gear 73. Consequently the face ratchet clutch 71 can reverse its direction without effecting the position of the dials which have been set. Furthermore, as the indicator assembly is advanced step by step toward the left for causing gears 55 to mesh successively with the gear 73, the dials which have been set are positively held against displacement by an arrester plate shown at 77 in FIGS. 2 and 3 which is fixed with respect to the frame of the machine and the upper edge of which is embraced by the gears 55 as the assembly moves toward the left. While this plate 77 is shown broken away in FIG. 3, it should be understood that it extends to a position directly adjacent the gear 73 which drives the gears 55. Thus the plate is received between two teeth of each gear 55 even before the gear fully disengages the gear 73 so that there is no possibility for the dial drums to rotate after the leftward movement described. The leftward movement is accomplished after the entry of each digit into the buffer memory by means of a sliding plate 79 (see FIGS. 1 and 14) which is advanced rearwardly after the entry of each digit by means later to be described. This plate imparts rocking movement to a rocker plate 80 through a pin and slot connection therewith and the rocker plate 80 in turn imparts leftward movement to a slidable plate 81. The plate 81 carries a pawl 82 (see FIG. 14) which engages a rack bar 84 (see FIG. 3) which is a part of the indicator assembly. A second stationary pawl 85 lying directly in front of the pawl 82 also engages the rack bar and retains the assembly in its adjusted position while the first pawl returns. Both pawls are urged toward the rack bar by springs such as shown at 86.

Once a number has been encoded on the buffer memory and set up on the indicator assembly it will remain upon the indicator until release mechanism is actuated. Actuation of the release mechanism, the details of which will be described hereinafter, effects swinging movement of shaft 57 (see FIG. 8) about the center of shaft 59, consequently separating gears 55 from their driving gear 73 and also raising gears 55 above the edge of arrestor plate 77. This permits return of all of the dials to zero under influence of their torsion springs and also raises the assembly free of the pawls 82 and 85 so that the assembly is returned to its home position by means of the spring 62 as before described.

Since it is necessary to provide interdigital spacing in time, the buffer memory drum must be rotated without pulses being directed to it after each series of pulses encoded on the buffer memory representing a single digit in a number. This is accomplished through a separate interdigital clutch and control mechanism, the clutch being shown at 88 in FIG. 7. This clutch operates in a manner generally similar to that of the clutch shown at 26 in FIG. 6. Adjacent to the clutch is a block or housing 89 which provides sliding support for a plate 90, the projecting end of which overlies a pin 91 carried by the pawl supporting plate 43 of the clutch 26. When the clutch 26 returns to its home position as previously described, the pin 91 engages a cam surface on the end of the slide plate 90 and retracts the plate against the action of a formed wire spring shown at 92 in FIG. 1. In this normal or retracted position of the slide plate, a lug 93 thereon overlies a pin 94 holding it in its depressed position shown in FIG. 7 which pin passes through a cylindrical slide 95. The pin 94 is normally urged upwardly by a spring 96 and the cylindrical slide 95 is normally urged toward its extended position by a spring 98. The clutch 88 has a pawl 99 corresponding to the pawl 42 of the clutch 26 and also a corresponding ratchet driver 100. The pawl is normally held out of engagement with the ratchet 100 by the extreme end of the slide 95 which occupies the position shown in FIG. 7 and a lug 101 projecting radially from the pawl support plate 102 is arrested by a shoulder on the end of the slide 95, this being the home position of the clutch. In the operation of clutch 26 previously described upon initial driving movement thereof, the pin 91 is removed from contact with the end of the slide plate 90 which slide plate moves forwardly sufficiently to permit the pin 94 of FIG. 7 to move upwardly behind the lug 93. Consequently upon return movement of the clutch 26 to its home position and retraction of plate 90, the lug 93 retracts the slide 95 through the pin 94 thus freeing lug 101 and permitting clutch 88 to drive one complete cycle where it is disengaged by reengagement of lug 101 with slide 95 which is now again moved forwardly. The slide 95 was only momentarily retracted because a pin 105, on the clutch pawl support plate, during the initial part of rotation of the clutch engaged the end of a lever 106 which is pivotally supported as at 107 swinging it downwardly to engage a flange 108 on the pin 94 to retract the pin from behind the lug 93 permitting it and the slide 95 to assume the normal extended position. Rotation of clutch 88 imparts rotary movement through a gear 103 comparable to but larger than gear 48 in FIG. 6 and thus through an overrunning clutch identical to that shown in FIG. 6 to the shaft 51 and consequently through the same gear train 28 of FIG. 1 to drive the buffer memory. A single rotation of clutch 88 is sufficient with the gear reduction employed to provide the required movement of the buffer memory for interdigital spacing. In order to provide current to the transducer while the digital clutch is in operation but to break the circuit supplying such current when the interdigital clutch is in operation, a pair of switch elements shown at 109 in FIGS. 1 and 8 is disposed adjacent the slide plate 90. This slide plate carries a pin 110 for bridging these elements only upon advancing movement of plate 90 which occurs immediately upon engagement of digital clutch 26.

It is during the interdigital motion just described that the dial mechanism is advanced one increment to the left as described above in connection with FIG. 14. It is the pin 105 in the interdigital clutch just described which engages an upstanding end of plate 79 (see also FIG. 3) to move the plate rearwardly for actuating the mechanism of FIG. 14.

Figure 4:
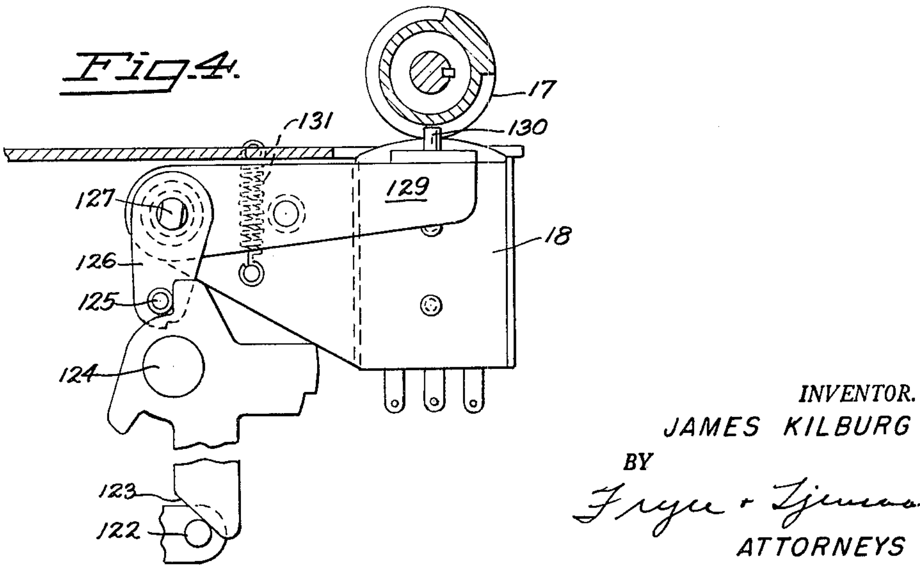
FIG. 4 is a fragmentary detail showing a portion of the buffer memory advancing mechanism and a transducer associated with the buffer memory.
Figure 10:
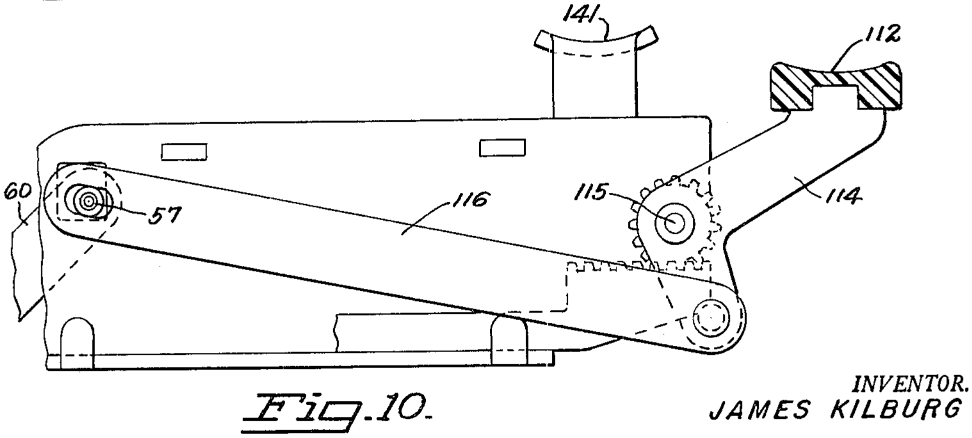
FIG. 10 is a view from the same side of the machine as FIG. 9 but showing means for clearing the indicator and returning it to its starting position after a number has been encoded.
Figure 11:
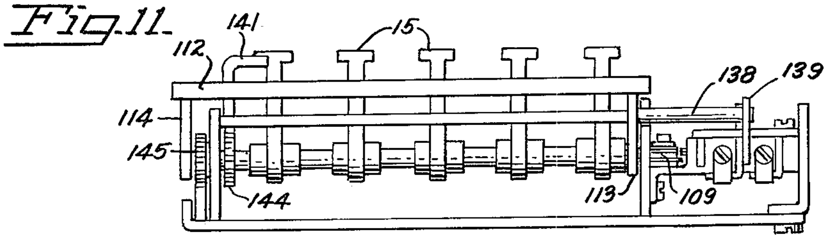
FIG. 11 is a front elevation reduced in size of the mechanism shown in FIG. 1 showing particularly the arrangement of a clearing bar.
Figure 12:
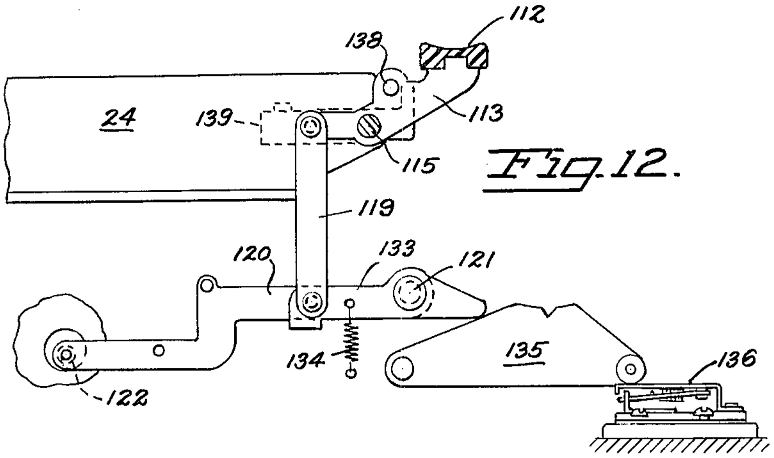
FIG. 12 is a sectional view taken on the line XII—XII of FIG. 1 and also illustrating additional mechanism associated with the clearing bar.

A clear bar is provided to return the indicator assembly and its dials to their home position and may also be used in the event that an error has been made during the setting up of a number on the keyboard to return the indicator assembly and also to return the buffer memory to its home position. This clear bar shown at 112 in FIGS. 10, 11 and 12 is supported by a pair of spaced levers 113 and 114 pivotally supported on a common shaft 115. The lever 114 on one side of the machine is a bell crank lever having pivotal connection with a link 116 engageable with the shaft 57 previously described (see FIG. 8) for effecting return of the indicator assembly to its home position. The lever 113 which supports the opposite side of the clear bar 112 is shown with a link 119 capable of raising a lever 120 about its pivotal support 121. The opposite end of the lever 120 carries a pin 122 which, as shown in FIGS. 4 and 12, lies beneath the cam surface on the lower end of a lever 123. Thus upward movement of the pin 122 swings lever 123 about its pivotal center 124 engaging a pin 125 which is secured to a shaft 127 for imparting rocking motion thereto.

The shaft 127 also supports the transducer carriage which carries the transducer 18 and a rigidly associated arm 129 with a lead screw pin 130 thereon, shown as engaged with the thread of the lead screw 17. Consequentially, this clockwise motion of lever 126 swings the transducer and pin 130 downwardly against the tension of a spring 131 and since the pin is removed from the lead screw thread the buffer memory and lead screw are returned to their home position under influence of a spring 118 (see FIG. 1).

Figure 7:
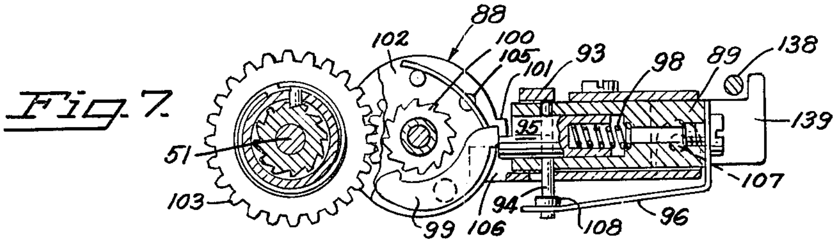
FIG. 7 is a view like FIG. 6 of another clutch and its control mechanism.

It is also necessary after a clearing operation to be sure that the lead screw pin does come into engagement with a thread of the lead screw and is in actual driving position therein. To accomplish this the lead screw and buffer memory are driven one complete turn or 360 degrees so that the pin will enter the thread of the screw and start its driving action to insure that the transducer will commence to trace a spiral path on the buffer memory. The mechanism for accomplishing this is shown in FIGS. 1, 11 and 12. In FIG. 12 the link 119 which moves upwardly upon depression of the clear bar is shown as connected with a second lever 133, also pivoted about the point 121 and urged downwardly by a spring 134. The end of this lever engages a lever 135 which closes a microswitch 136 for the purpose of energizing the motor of the dialing machine disclosed in the above mentioned copending application and from which motor the power for the present encoding machine is derived. At the same time, a third clutch which is a single cycle clutch shown at 137 in FIG. 1 is engaged for imparting driving movement through the gear train 28 to the buffer memory. This clutch is identical in construction with the interdigital clutch shown in FIG. 7 which drives the shaft 51 through an overriding clutch identical with those shown in FIGS. 6 and 7. However, due to the gear ratio between the clutches and the gear train 28 a single cycle of clutch 137 will drive the buffer memory through a full turn or more whereas a single cycle of the clutch 88 drove it only through approximately 120°. Engagement of the clutch is also effected upon depression of the clear bar by means of a pin 138 thereon also shown in FIGS. 1 and 11 which retracts a sliding plate 139 identical in function with the plate 90 described in connection with FIGS. 6 and 7. Thus depression of the clear bar effects engagement of clutch 37 for a single cycle and the position of the sliding plate which accomplishes this is also shown in FIG. 7.

Figure 9:
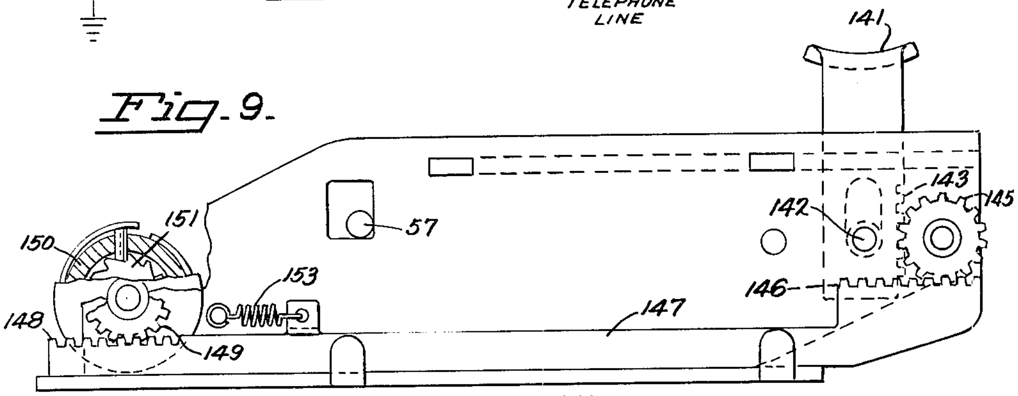
FIG. 9 is an elevation taken from the left side of FIG. 1 with parts in section showing means for producing a pause of greater than the usual interdigital time.

Up to this point encoding of numbers on the buffer memory has been described together with interdigital spacing. When these numbers are decoded into a telephone circuit, there are occasions as fully described in the aforementioned co-pending application where it is necessary to dial one or more numbers then to effect a pause while the calling party awaits a dial tone. Such occasions arise in connection with interoffice telephone systems where the co-called nine level method of dialing is employed; that is where a single number such as nine is dialed in order to obtain connection with the central office of the telephone company. When this connection is made, a dial tone is awaited before dialing the number to be called. Such pauses or dial tone waiting periods are also required in some direct distance dialing. To accomplish this and make possible the placing of the entire number in a single group of numbers capable of being decoded by the transducer, the machine of the aforementioned application provides means for interrupting a decoding function in the event that the space between numbers encoded exceeds the normal interdigital space. It is desirable, therefore, to provide for this pause in encoding numbers on the buffer memory of the present machine so that the pause will occur not only if the number is called into the telephone circuit but also when it is transferred to the tape of the automatic dialer. This is accomplished by manually advancing the buffer memory through a separate key provided for that purpose. Such a key shown at 141 in FIGS. 1 and 9 is marked with a "P" for pause. The key 141, as shown in FIG. 9, is guided through an opening in the keyboard plate and by a pin and slot indicated at 142. A rack 143 formed on one edge of the key meshes with a gear 144 (see FIG. 1) which is identical in size and fixed for rotation with a gear 145 meshing with a rack 146 on a link 147. The link 147 is slidably supported and its opposite end has a rack 148 meshing with a gear 149 which drives the housing 150 of an overrunning clutch having a ratchet wheel 151 identical in construction and function with the overrunning clutches shown in FIGS. 6 and 7. This effects rotation of the buffer memory through approximately 20° and since this occurs after a number has been encoded and the interdigital time provided, the space between that number and the next succeeding one will exceed the normal interdigital spacing and effect the pause or dial tone weight which is desired. The actual driving of the buffer memory is not accomplished upon depression of the key 141 but rather upon release of the key when a spring 153 returns the link 147 to its initial position after the overrunning clutch has been advanced one tooth with respect to the ratchet wheel 151.

The description of the drive of the buffer memory to this point has related to its operation during the encoding of a number thereon. In the present machine, encoding on the buffer memory is done at an accelerated rate of speed, that is, at a rate greater than that which is used in decoding a number into a telephone circuit. Therefore, rotation of the buffer memory for decoding into a telephone circuit must be at a slower rate. Furthermore, when the buffer memory is operated to transfer its code or encode onto the tape or drum of an automatic telephone dialer, it must be operated at a speed comparable to that of the encoding speed of the dialer. In the case of the dialer disclosed in the above mentioned co-pending application, the encoding speed happens to be the same as the speed employed in dialing telephone numbers. Consequently, the buffer memory of the present device is actuated at the same speed for either of the two functions of dialing a telephone number directly from the buffer memory or transferring the number thereon into an automatic dialing machine. This is accomplished by a gear 156 (see FIG. 1) fixed to the hub of a ratchet drum 157 which drives a ratchet wheel 158 fixed to the shaft which drives the feed screw 17 of the buffer memory. The gear 156 is driven preferably from the same source of power that drives the gear 27 through suitable reduction gearing (not shown) to obtain the desired speed referred to above. The ratchet clutch which includes the drum 157 and the ratchet wheel 158 is identical with the ratchet clutch or overriding clutch shown in FIGS. 6 and 7 except that the ratchet wheel 158 is wider and serves as the ratchet wheel for a second drum 159 which is driven by the gear train 28 which drives the buffer memory at a higher speed. Consequently, when the buffer memory is driven through the gear train 28, the ratchet wheel 158 will not drive the drum 157 and when it is driven by the gear 156, the ratchet wheel will not drive the drum 159.

When the buffer memory is being driven by either of the aforementioned drives, it is necessary that it come to rest in a position where the brushes 20 stop between the contact bars of the commutator 19. To this end, detent mechanism is employed, as best shown in FIG. 5, wherein a spring pressed ball 160 is shown as engaging the periphery of a serrated wheel 161 rotatable with the feed screw 17 and buffer memory and indexed to insure that the brushes are not in contact with the bars in the rest position.

Figure 5:
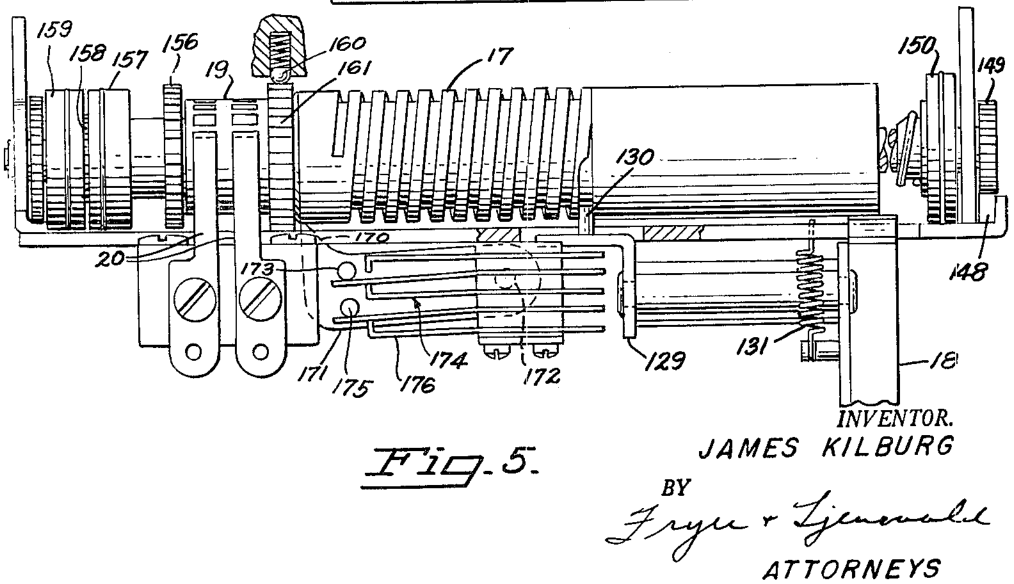
FIG. 5 is a view in rear elevation of the buffer memory and associated mechanism viewed as from the upper side of FIG. 1.

During the initial movement of the buffer memory for a decoding operation its left end, as viewed in FIG. 5, rides over an incline 170 on a lever 171 pivoted as at 172. This lever carries a pin 173 normally holding the contact of a shunt switch 174 in its shunt position, this switch being included in the shunt circuit of FIG. 13. The lever 171 moves upwardly to break this contact and to establish a play back circuit. A second pin 175 on the lever permits opening of a switch 176, the closed position of which insures an initial impulse to a clutch actuating solenoid, the operation of which is disclosed in the above mentioned co-pending application but is not necessary to an understanding of the present invention.

Figure 13:
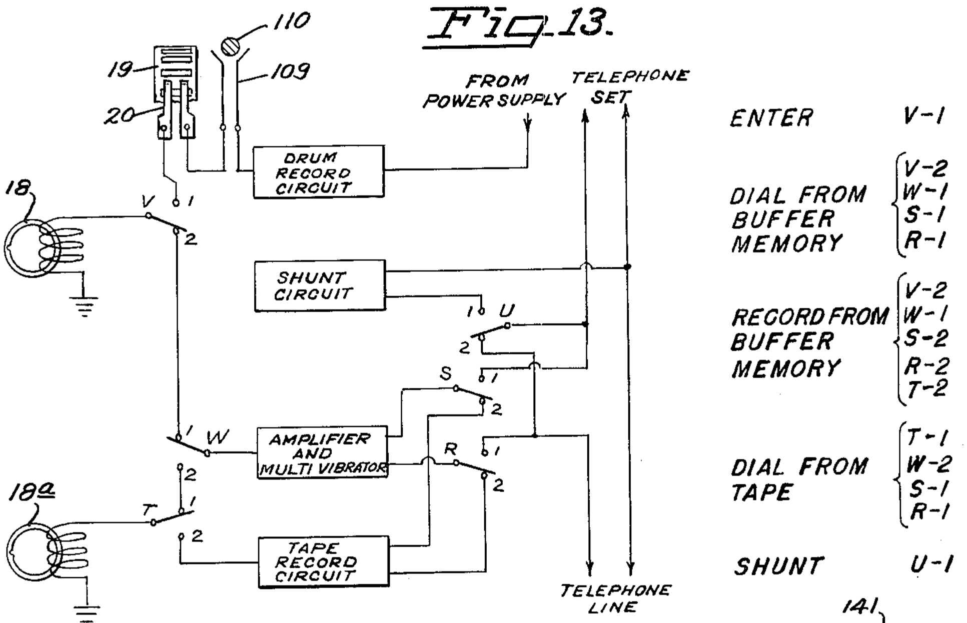
FIG. 13 is a schematic view of the record and playback circuits of the machine also showing a portion of the circuit of an automatic dialing machine.

The electrical diagram of FIG. 13 is principally to show the type of switching circuit which is employed for the various functions of the encoding and decoding mechanism hereinabove described. The transducer of the present mechanism is shown at 18 and a transducer 18*a* is shown as representing a transducer on a magnetic dialer which for present purposes is employed for encoding on the tape or drum of the dialer. As clearly shown in this diagram, power from a suitable source is employed to encode or enter information on the buffer memory through the transducer 18 upon closing of a switch V–1, it being understood that the switch pin 110 has entered between the switch elements 109 upon initial rotation of the buffer memory. As indicated in the legend to the right of FIG. 13, dialing into a telephone line from the buffer memory is accomplished by closing four switches. Similarly, to record from the buffer memory or, in other words, to translate information contained on the buffer memory to the transducer 18*a* of a telephone dialing machine is accomplished by the closing of five switches whereas dialing or decoding from the tape or drum of such a machine into the telephone line is accomplished by the closing of four switches. The entire circuit of the present machine is shunted from the telephone line upon closing a single switch. The mechanical structure of the switches is not shown as various types of multiple contact switches may be employed for this purpose and in such switches, all of the necessary circuits are opened and closed upon manipulation of a single manually actuated member.

What is claimed is:

1. In an encoding mechanism for use in conjunction with a repertory telephone dialer having a semi-permanent memory for storing telephone numbers in code form the combination comprising;

a buffer memory upon which a telephone number may be represented by code;

means for encoding telephone numbers onto said buffer memory in code form;

means electrically communicating said buffer memory with the semi-permanent memory of the repertory dialer, and also with the repertory dialer; and means selectively operable to induce a telephone number on said buffer memory to be transferred to the semi-permanent memory of the repertory dialer or employed to operate the repertory dialer to dial the number.

2. The encoding mechanism of claim 1 further described by said buffer memory being operable to retain a number encoded thereon even after it is used to dial a number by the repertory dialer, and said encoding means operable to clear said buffer memory of information thereon when employed to enter a number thereon.

3. An encoding mechanism for use in telephony comprising in combination;

a buffer memory upon which a telephone number may be represented in code;

means to create spaced impulses and to translate them into code symbols on the buffer memory;

means to establish a selection of such impulses in spaced groups representing digits of a telephone number;

separate means to actuate said buffer memory to dial the number encoded thereon into impulses in a telephone circuit wherein said separate means is operable repeatedly to dial the same number with further operation of said selection means; and a visible numerical display operable in response to operation of said selection means, wherein said display comprises a group of numbered dials spring urged toward a zero position, means for moving said dials step by step in an axial direction as they are turned to display numbers, latching means preventing their return as they are so moved, and means to release the latching means simultaneously on all dials.

4. In a repertory dialer in which response to actuation of selected keys of a keyboard, the successive digits of a telephone number are displayed on a counter and signals representing such digits are magnetically stored in a memory, mechanism for actuating the counter and the memory comprising.

(a) a first clutch mechanism, engageable for periods of time representative of selective keys connecting the counter and the memory to a source of power, thereby to set the successive digits of a telephone number in the counter and to actuate the memory to store signals representing such digits in the memory;

(b) a second clutch mechanism, engageable for a fixed period of time immediately following each disengagement of the first clutch mechanism connecting only the memory to the source of power to form interdigital spaces between the signals representing digits; and, (c) a third clutch mechanism, manually actuable when both the first and the second clutch mechanisms are disengaged, connecting only the memory to the source of power to form, after any one of the signals stored in the memory, a space greater than any one of the interdigital spaces.

5. In a repertory dialer, mechanism as in claim 4 wherein the memory comprises:

(a) a magnetic drum, a lead screw and a commutator mounted on a common shaft geared to the first, second and third clutch mechanisms;

(b) a magnetic transducer slidably mounted on a shaft parallel to the common shaft;

(c) a pin affixed to the magnetic transducer and engageable with the lead screw;

(d) means for connecting the magnetic transducer in circuit with the commutator; and, (e) means for energizing the commutator only when the first clutch mechanism is engaged.

References Cited by the Examiner

UNITED STATES PATENTS

| | | | |
|---|---|---|---|
| 2,921,142 | 1/1960 | Tinus | 179—90 |
| 2,941,043 | 6/1960 | Ham et al. | 179—90 |
| 3,037,192 | 5/1962 | Everett | 340—172.5 |
| 3,040,133 | 6/1962 | Kobler et al. | 179—90 |

ROBERT H. ROSE, *Primary Examiner.*

H. W. GARNER, S. J. BOR, *Assistant Examiners.*